(12) United States Patent
Suehiro

(10) Patent No.: US 6,833,934 B1
(45) Date of Patent: Dec. 21, 2004

(54) TRANSMISSION RESULT OUTPUT METHOD FOR USE IN DATA TRANSMISSION APPARATUS

(75) Inventor: Tatsuo Suehiro, Hino (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/501,213

(22) Filed: Feb. 10, 2000

(51) Int. Cl.$^7$ .............................................. H04N 1/32
(52) U.S. Cl. ...................... 358/468; 358/400; 358/405; 358/407; 345/173; 345/174
(58) Field of Search .................. 358/468, 1.15, 358/1.16, 401, 403, 404, 405, 400, 440, 442; 345/173, 174

(56) References Cited

U.S. PATENT DOCUMENTS

| | | | |
|---|---|---|---|
| 5,155,602 A | | 10/1992 | Terajima |
| 5,309,434 A | * | 5/1994 | Maekawa ..................... 370/265 |
| 5,552,901 A | * | 9/1996 | Kikuchi et al. .............. 358/468 |
| 5,579,126 A | * | 11/1996 | Otsuka ......................... 358/403 |
| 5,668,640 A | * | 9/1997 | Nozawa et al. .............. 358/434 |
| 5,757,511 A | * | 5/1998 | Kaneyama ................... 358/403 |
| 5,877,746 A | * | 3/1999 | Parks et al. .................. 345/156 |
| 6,029,238 A | * | 2/2000 | Furukawa ....................... 712/1 |
| 6,072,599 A | * | 6/2000 | Oba et al. .................... 358/444 |
| 6,119,142 A | * | 9/2000 | Kosaka ......................... 709/200 |
| 6,130,757 A | * | 10/2000 | Yoshida et al. ............. 358/1.15 |
| 6,151,133 A | * | 11/2000 | Sakauchi et al. ........... 358/1.15 |
| 6,239,880 B1 | * | 5/2001 | Barrett et al. .............. 358/1.16 |
| 6,313,926 B1 | * | 11/2001 | Kumagai et al. ............ 358/442 |
| 6,369,914 B1 | * | 4/2002 | Miura ......................... 358/403 |
| 6,452,688 B1 | * | 9/2002 | Suzuki ....................... 358/1.15 |
| 6,466,327 B2 | * | 10/2002 | Inaba et al. ................ 358/1.13 |
| 6,466,968 B2 | * | 10/2002 | Shirai et al. ................ 709/206 |
| 6,590,673 B2 | * | 7/2003 | Kadowaki ................... 358/1.15 |
| 6,639,693 B1 | * | 10/2003 | Ejiri et al. .................. 358/434 |

FOREIGN PATENT DOCUMENTS

| | | |
|---|---|---|
| JP | 63-119364 A | 5/1988 |
| JP | 3-248660 A | 11/1991 |
| JP | 4-003578 A | 1/1992 |
| JP | 5-167758 A | 7/1993 |
| JP | 6-105054 | 4/1994 |
| JP | 8-204936 A | 8/1996 |
| JP | 9-046502 A | 2/1997 |
| JP | 11-177799 A | 7/1999 |

* cited by examiner

*Primary Examiner*—Kimberly Williams
*Assistant Examiner*—Tia Carter
(74) *Attorney, Agent, or Firm*—Foley & Lardner LLP

(57) ABSTRACT

As described above, a user selects desired ones of the transmission results and then depresses the start key. Then, only the selected transmission results are extracted from the transmission results recorded in a transmission management section 18a and are printed in a transmission management record. Thus, only the transmission results selected from many, which the user wishes to check, can be printed. This prevents a waste of paper sheets. Moreover, since only the transmission results the user has selected are printed in the form of a transmission management record, the user can check and confirm them easily.

10 Claims, 7 Drawing Sheets

| RECEPTION NUMBER | DESTINATION | DATE AND TIME | NUMBER OF DOCUMENT SHEETS | RESULT |
|---|---|---|---|---|
| 001 | TOKYO 1 | 17. 14:30 | 10 | OK |
| 002 | TOKYO 2 | 17. 15:00 | 5 | OK |
| 003 | TOKYO 3 | 17. 15:30 | 1 | OK |
| 004 | TOKYO 4 | 17. 17:00 | 20 | OK |

FIG. 3

| RECEPTION NUMBER | DESTINATION | DATE AND TIME | NUMBER OF DOCUMENT SHEETS | RESULT |
|---|---|---|---|---|
| 001 | TOKYO 1 | 17. 14:30 | 10 | OK |
| 002 | TOKYO 2 | 17. 15:00 | 5 | OK |
| 003 | TOKYO 3 | 17. 15:30 | 1 | OK |
| 004 | TOKYO 4 | 17. 17:00 | 20 | OK |

TRANSMISSION MANAGEMENT RECORD

| SERIAL NUMBER | RECEPTION NUMBER | DATE | TIME | TIME OF TRANSMISSION | NUMBER OF SHEETS | DESTINATION | COMMUNICATION MODE | RESULT |
|---|---|---|---|---|---|---|---|---|
| 001 | 001 | 9. 17 | 14:30 | 05:00 | 10 | TOKYO 1 | EC | OK |
| 002 | 002 | 9. 17 | 15:00 | 02:30 | 5 | TOKYO 2 | EC | OK |
| 003 | 003 | 9. 17 | 15:30 | 00:30 | 1 | TOKYO 3 | EC | OK |
| 004 | 004 | 9. 17 | 17:00 | 10:00 | 20 | TOKYO 4 | EC | OK |
| xxx | xxx | xxxx | xxxxx | xxxxx | xx | xxxxxxxxxxxxxxxxxx | xx | xx |
| xxx | xxx | xxxx | xxxxx | xxxxx | xx | xxxxxxxxxxxxxxxxxx | xx | xx |
| xxx | xxx | xxxx | xxxxx | xxxxx | xx | xxxxxxxxxxxxxxxxxx | xx | xx |
| xxx | xxx | xxxx | xxxxx | xxxxx | xx | xxxxxxxxxxxxxxxxxx | xx | xx |

100 MORE DATA ITEMS TRANSMITTED WILL FOLLOW

FIG. 6

TRANSMISSION MANAGEMENT RECORD

| SERIAL NUMBER | RECEPTION NUMBER | DATE | TIME | TIME OF TRANSMISSION | NUMBER OF SHEETS | DESTINATION | COMMUNICATION MODE | RESULT |
|---|---|---|---|---|---|---|---|---|
| 002 | 002 | 9. 17 | 15:00 | 02:30 | 5 | TOKYO 2 | EC | OK |
| 004 | 004 | 9. 17 | 17:00 | 10:00 | 20 | TOKYO 4 | EC | OK |

| RECEPTION NUMBER | DESTINATION | DATE AND TIME | NUMBER OF DOCUMENT SHEETS | RESULT |
|---|---|---|---|---|
| 002 | TOKYO 2 | 17. 15:00 | 5 | OK |
| 004 | TOKYO 4 | 17. 17:00 | 20 | OK |

| NEXT PAGE | PREVIOUS PAGE |
|---|---|

FIG. 8

TRANSMISSION RESULT OUTPUT METHOD FOR USE IN DATA TRANSMISSION APPARATUS

BACKGROUND OF THE INVENTION

The present invention relates to a data transmission apparatus for use in a composite-type digital copier that performs various functions such as copying function, facsimile function and printing function.

A conventional data transmission apparatus, such as a facsimile apparatus, can print the results of transmission at the request of the user, enabling the user to confirm the result of transmission. In such a data transmission apparatus, a table of the results of transmitting a prescribed number of data items is printed to be used as a management record of the data items transmitted. The data transmission apparatus automatically prints a management record every time the results of transmitting a prescribed number of data items are accumulated. Reading the transmission management record, the user can confirm the results of transmission. The user can keep the record in his or her file.

The results of transmitting many data items, e.g., 100 data items, are printed altogether on a transmission management record. The table of the results of so many data items, in the form of a table, is too large to be printed on a single sheet of paper. It is usually printed on a plurality of paper sheets, for example three paper sheets.

In most cases, many users uses the same facsimile apparatus. Each of these users needs to print a management record of the results of transmitting data items, in order to confirm what data items he or she has sent by facsimile or to keep the record in his or her file. Of the results printed in the management record, many concern with the data items sent by the other user of the facsimile apparatus. The user need not review such results of transmission. Nonetheless, every time the user wants to confirm what data items he or she has transmitted, he or she cannot help but print a management record of several pages. This is an waste of paper sheets.

The results of transmitting data items, which the user needs to review, are printed among the transmission results about the data items the other users have sent and are, therefore, are hard to find. The user ticks all transmission results concerning the data items he or she has sent, with a felt pen or the like, to make it easy to check the transmission results again. It takes him or her much time to tick the transmission results.

Some types of composite-type digital copiers, each performing copying function, facsimile function, printing function and the like, have a large display section such as a liquid crystal display. The large display section of such a copier can display the transmission results, in the form of a table. Seeing the table displayed, any user can check the transmission results. If the user designates the function of printing on the screen that is displaying the transmission results, a transmission management record will be printed. Reading the record, the user can confirm the results of transmission. Further, the user may keep the record in his or her file.

The number of transmission results the large display section of such a copier can display on its screen is limited, however. The user must perform a screen-related operation until the user finds a particular transmission result on the screen to check the transmission result. If the user needs to find and check many transmission results, the screen-related operation will be complicated.

BRIEF SUMMARY OF THE INVENTION

As described above, when a user prints the transmission results that he or she needs to check, the other transmission results are printed as well. This leads to a waste of paper sheets and makes it difficult to find the transmission results which the user wants to check. The present invention has been made to solve the problem. An object of the invention is to provide a data transmission apparatus which helps to print the results of transmitting a plurality of data items, without a waste of paper sheets, in such a way that the transmission results printed may be found easily.

When a display section displays a plurality of transmission results, the operation the user must perform to find the transmission results he or she wishes check will become complicated. This invention has been made to solve this problem, too. Another object of the invention is to provide a data transmission apparatus which enables the user to find the transmission results he or she wants and which is easy for the user to operate.

A data transmission apparatus according to the present invention is one that is be connected to an external apparatus by a communication line. The apparatus comprises: transmitting means for transmitting data to the external apparatus through the communication line; a memory for storing results of transmission effected by the transmitting means; selecting means for selecting some of the results of transmission stored in the memory; and output means for outputting only the results of transmission which have been selected by the selecting means.

A method of outputting transmission results, according to this invention is designed for use in a data communication apparatus connected to an external apparatus by a communication line and comprising transmitting means for transmitting data to the external apparatus through the communication line and a memory for storing results of transmission effected by the transmitting means. The method comprises: a first step of selecting some of the results of transmission stored in the memory; and a second step of outputting only the results of transmission which have been selected in the first step.

BRIEF DESCRIPTION OF THE SEVERAL VIEWS OF THE DRAWING

FIG. 3 is a diagram showing a transmission management record displayed by a display section;

FIG. 4 is a diagram depicting a transmission management record displayed, in which some transmission results have been selected;

FIG. 5 shows an example of a transmission management record which has been printed;

FIG. 6 illustrates a printed record, showing only the transmission results selected;

FIG. 8 illustrates an example showing only the transmission results that correspond to an user ID.

DETAILED DESCRIPTION OF THE INVENTION

Figure 1:
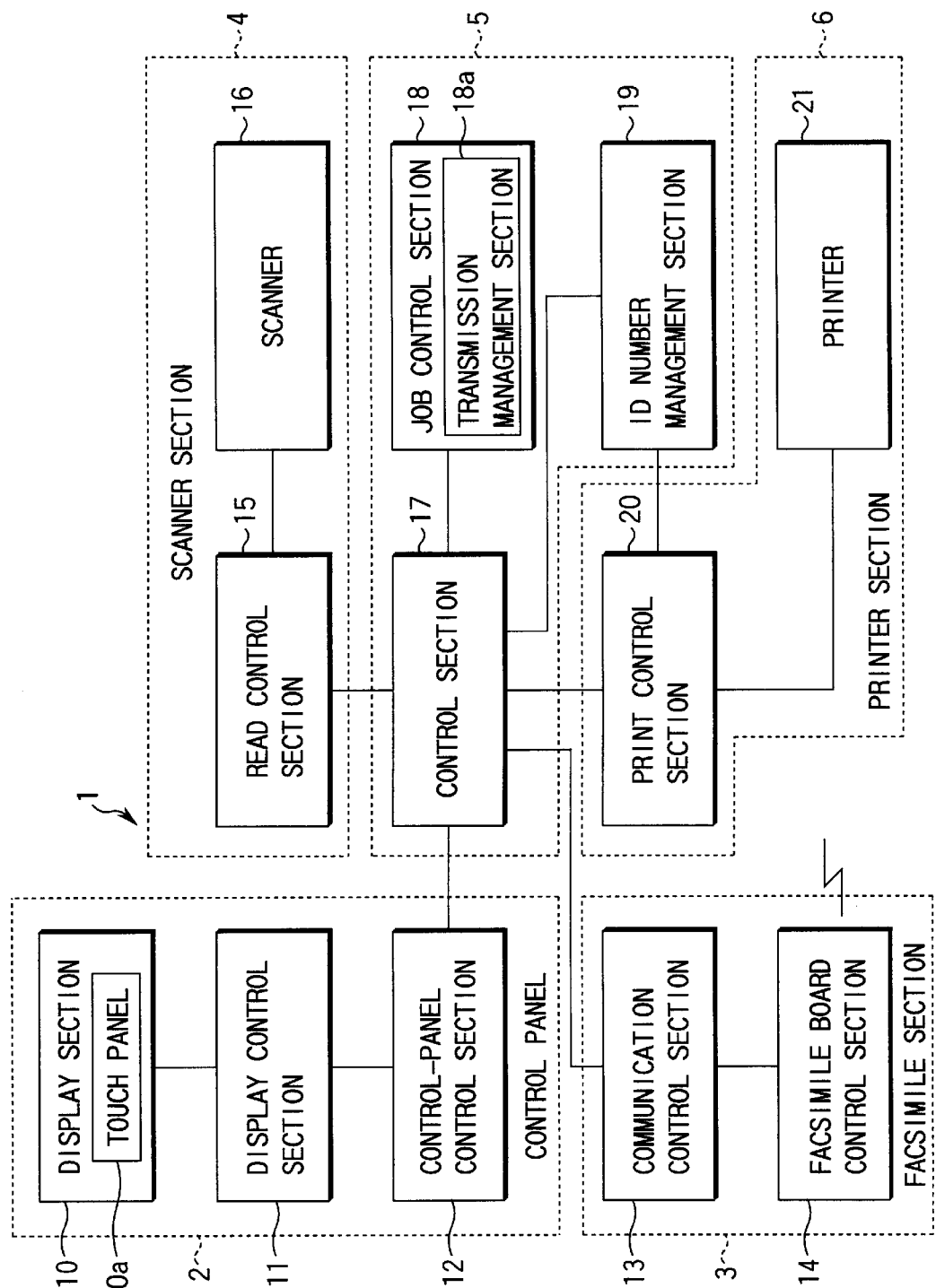
FIG. 1 is a block diagram showing the internal structure of a composite-type digital copier.

FIG. 1 is a block diagram showing the internal structure of a composite-type digital copier 1, which is a data transmission apparatus according to the present invention.

The copier 1 has copying function, printing function, facsimile function, and the like. As shown in FIG. 1, the copier 1 comprises a control panel 2, a facsimile section (transmission means) 3, a scanner section 4, a main control section 5, and a printer section (output means) 6. The control panel 2 is operated so that various operations may be effected in the copier 1. The control panel 2 also displays various guidance to users. The facsimile section 3 performs data communication with an external apparatus through a communication line. The scanner section 4 optically reads the image printed on an original document. The main control section 5 controls the whole copier 1. The printer section 6 forms an image on a copy sheet (image recording medium).

The copying function is performed when the scanner section 4 reads an image and the printer section 6 prints the image, under the control of the main control section 5. The printer function is carried out when the printer section 6 prints the data supplied from the external apparatus via an interface (not shown), under the control of the main control section 5.

The facsimile function is effected to transmit data, when the scanner section 4 reads an original document and the facsimile section 3 transmits the image, thus read, to the external apparatus through a public line. The facsimile function is performed to receive data, when the printer section 6 prints the data which the facsimile section 3 has received from the external apparatus.

The control panel 2 comprises a display control section 11, a control-panel control section 12, a display section (output means) 10, and various hard keys. The facsimile section 3 comprises a communication control section 13 and a facsimile board control section 14. The scanner section 4 comprises a read control section 15 and a scanner 16. The main control section 5 comprises a control section 17, a job control section 18, and a ID number management section 19. The printer section 6 comprises a print control section 20 and a printer 21.

The display control section 11 controls the display section 10 with an incorporated touch panel 10a provided on the control panel 2. The control-panel control section 12 controls the entire control panel 2.

The communication control section 13 controls the transmission and receipt of data achieved by the facsimile function. Under the control of the communication control section 13, the facsimile board control section 14 transmits data to and received data from the external apparatus through a line.

The scanner 16 reads a document optically under the control of the read control section 15. The document is placed on the document table (not shown). The scanner 16 incorporates an automatic document feeder (ADF) (not shown) and reads sheets of the document, one after another.

The control section 17 controls the copier 1 as a whole. The control section 17 is connected to the job control section 18 and the ID number management section 19. The job control section 18 has a transmission management section 18a that records the transmission results concerning the data items transmitted by use of the facsimile function. The user ID management section 12 manages the user IDs (identification data) given to the users who use the copier 1 in common.

The printer 21 prints an image or data on a copy sheet (image recording medium), under the control of the print control section 20. The printer 21 prints the transmission results which are recorded in the transmission management section 18a.

Figure 2:
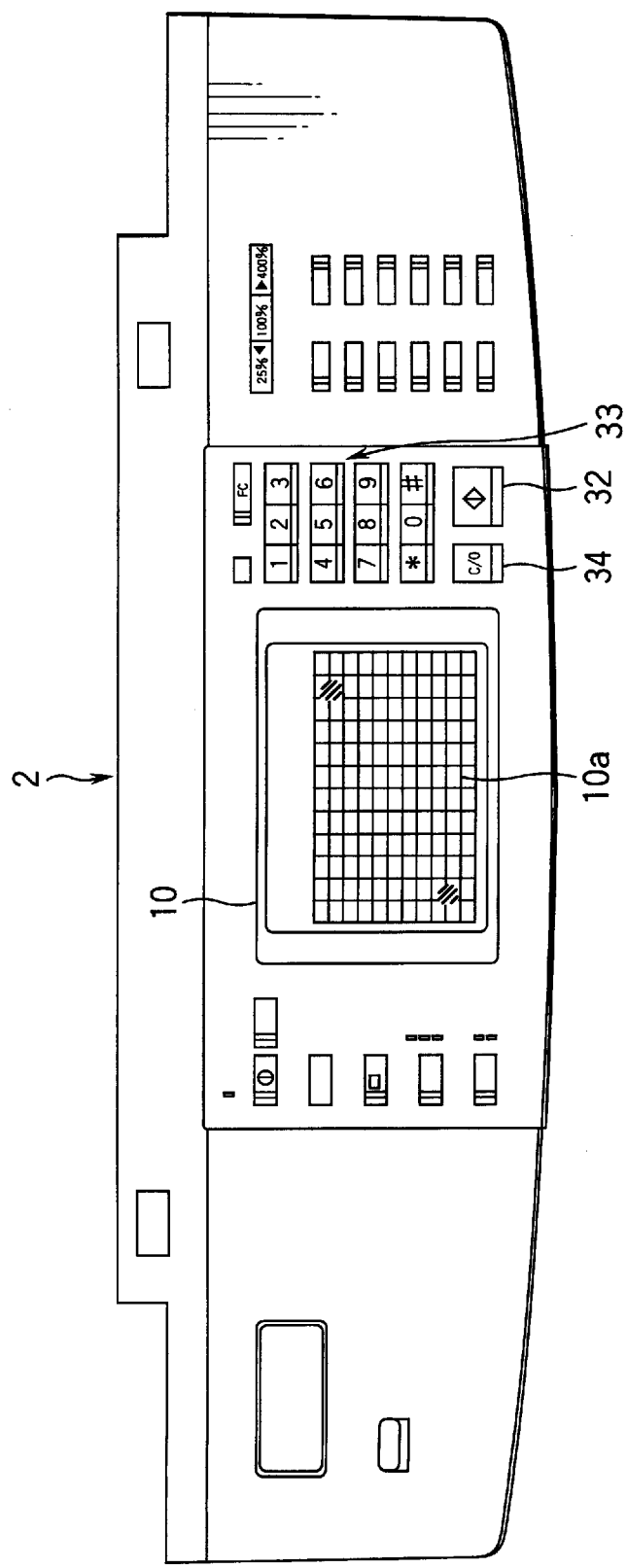
FIG. 2 illustrates the outer appearance of a control panel.

FIG. 2 shows the outer appearance of the control panel 2.

As shown in FIG. 2, the control panel 2 has a display section 10, a start key 32, a ten-key pad 33, a clear key 34, and the like. The display section 10 is a large liquid crystal panel. The liquid crystal panel, or the display section 10, incorporates the touch panel 18a.

When the start key 32 is depressed, the copying function is actuated to start copying, or the facsimile function is actuated to start transmitting data. The ten-key pad 33 has numeral keys, 0 to 9; and some symbol keys. The clear key 34 is depressed to clear the data items input and numerical data input which have been input.

How the facsimile function of the copier 1 works to transmit data will be described. To transmit a document by facsimile, the user selects operates the touch panel 10a of the control panel 2, thereby selecting the facsimile function. When the facsimile function is selected, the control section 17 causes the job control section 18 to actuate the facsimile function. The display section 10 displays a menu screen of a transmission mode such as the image mode of facsimile transmission.

Next, the user sets the document in the scanner 16 and operates the ten-key pad 33, thus inputting the telephone number of the destination to which the document is to be sent by facsimile. The telephone number may be registered in association with the destination. In this case, the telephone number input when the user designates the destination displayed on the touch panel 10a.

Then, the user depresses the start key 32, instructing that the facsimile data transmission be started. The control section 17 makes the scanner section 4 start reading the document. At the same time, the control section 17 causes the communication control section 13 to connect the copier 1 to the telephone of the destination that has been designated by operating the facsimile board control section 14. Once the connection is made, the control section 17 transmits the image of the document read by the scanner 4.

The transmission management section 18a records and manages the results of this transmission accomplished by the facsimile function. The transmission results recorded in the transmission management section 18a are associated with a serial number and a reception number. They are: the month, the day and time, the transmission time, the number of document sheets, the destination, the telephone charge, the transmission mode, and the transmission result.

The transmission result will be recorded as "OK" in the transmission management section 18a if the facsimile transmission is accomplished without troubles. If the facsimile transmission is not normally accomplished, the transmission result will be recorded as "NG." If the transmission is interrupted while the facsimile function remains valid, the transmission result will be recorded as "NG" and the number of document sheets successfully transmitted will be recorded.

The transmission management record displayed by the display section 10 will be described below.

FIG. 3 shows the transmission management record 40 that the display section 10 displays. As shown in FIG. 3, the transmission management record 40 consists of items, i.e., reception number, destination, date and time, number of document sheets, and transmission result. The reception number is assigned to each facsimile transmission effected. The destination, day and time, number of document sheets and transmission result are displayed in association with the reception number. The destination is displayed if its telephone number is registered. If the telephone number is not registered, it will be displayed, not the destination.

In the lower part of the display section 10, two page icons 41a and 41b are displayed for the next page and the preceding page, respectively. If the next-page icon 41a is designated, the display section 10 will display the transmission management record of the next page. If the preceding-page icon 41b is designated, the display section 10 will display the transmission management record of the preceding page.

FIG. 4 shows a transmission management record displayed, in which some transmission results have been selected from the transmission management record 40 illustrated in FIG. 3. To select the reception numbers 002 and 004 from the transmission management record 40, the user depresses those parts of the touch panel 10a where the reception numbers 002 and 004 are displayed. The display control section 11 then displays the items associated with the selected reception numbers, in reverse mode as is illustrated in FIG. 4.

How the transmission management record is printed will be now described.

The transmission management record to be printed consists of a plurality of transmission results. The transmission results are: the serial number, the reception number, the date, the time, the transmission time, the number of sheets, the destination, the transmission mode, and the result. The transmission results in the transmission management record are automatically printed when the number of the data items transmitted reaches a predetermined value or are printed when the user performs operation.

FIG. 5 shows a transmission management record printed in its entirety. Transmission management records may be automatically printed, each for 100 data items transmitted. If this is the case, the control section 17 starts printing a transmission management record when the number of data items transmitted reaches the value of 100. As shown in FIG. 5, the transmission management record, thus printed, shows the 100 transmissions arranged in the order they have been accomplished. So many transmissions cannot be printed on a single copy sheet. Rather, they are printed on a plurality of copy sheets. Thus, the printed record is composed of several pages.

FIG. 6 illustrates a printed record, showing only the transmission results the user has selected. The user operates the control panel 2, thereby selecting the transmission results he or she wishes to review. The user then instructs that only the transmission results selected be printed. The control section 17 prints a transmission management record which shows only the transmission results the user wants to review, as is illustrated in FIG. 6. Since only the desired transmission results are printed on the record, the user can confirm them easily.

How a transmission management record is printed will be described below.

Figure 7:
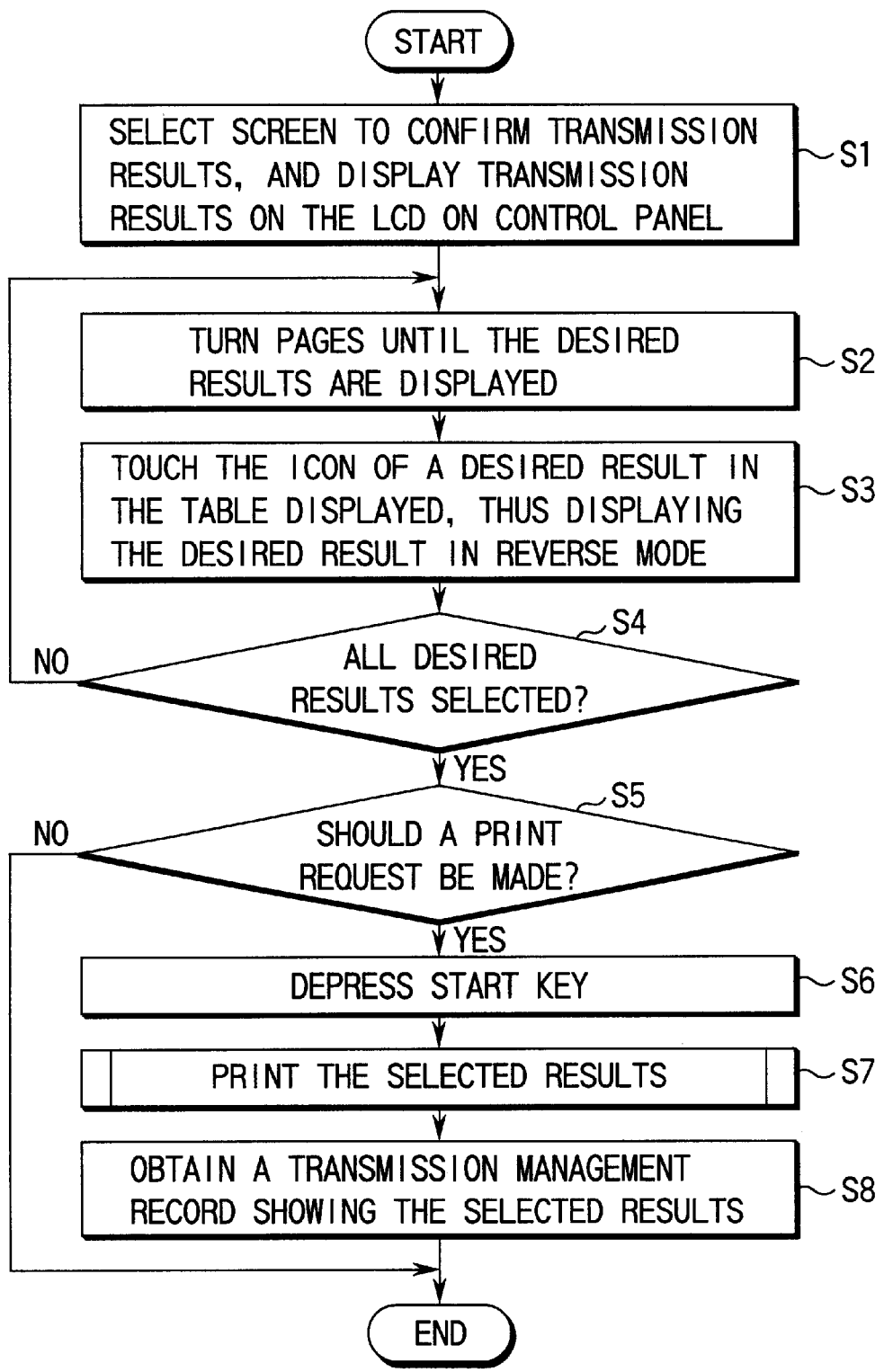
FIG. 7 is a flow chart for explaining how a transmission management record is printed.

FIG. 7 is a flow chart for explaining how a transmission management record is printed. As shown in FIG. 7, the user operates the control panel 2, selecting a screen for confirming the results of facsimile transmission. Then, the control-panel control section 12 causes the display section 10 to display a table of the transmission results as illustrated in FIG. 3 (Step S1).

The user depresses the next-page icon 41a or the preceding-page icon 41b to change the page displayed. If the next-page icon 41a is depressed, the next page will be displayed. If the preceding-page icon 41b is depressed, the preceding page will be displayed (Step S2).

The turns pages until the desired transmission results are displayed. When the user sees a desired result displayed, he or she touches that part of the screen where the desired result is displayed. The touch panel 10a detects that part of the screen. The display control section 11 displays the selected transmission result in reverse mode as shown in FIG. 4. (Step S3). The user repeats Steps S2 and S3, thereby selecting the other transmission results he or she wishes to check.

Once all desired transmission results have been selected (Step S4), the user can instruct that the transmission results selected be printed (Step S5). If the user wants to get the results printed, he or she depresses the start key 32 (Step S6).

When the start key 32 is depressed, the control section 17 makes the printer section 6 print only the transmission results selected (Step S7). Thus, a transmission management record is printed, which shows only the transmission results the user has selected (Step S8).

As described above, the user selects some of the transmission results recorded in the transmission management section 18a. The user then depresses the start key, thereby obtaining a transmission management record which shows only the transmission results he or she has selected.

Since only those of many transmission results which the user has selected are printed, there is no waste of paper sheets. In addition, the user can easily check and conform the desired transmission results, because the transmission management record shows only the transmission results the user has selected.

It will now be described how many users use the copier 1, by the use of their user IDs.

An user ID is the identification data assigned to each user of the copier 1. The user ID is managed by a user ID management section 21. The user ID contains the data that the user must input to send an data item by facsimile.

FIG. 8 illustrates only the transmission results that correspond to an user ID, which are displayed by the display section 10. To check the transmission results, the user operates the ten-key pad or the like of the control panel 2, thereby inputting his or her user ID to have the screen displayed for confirming the transmission results. When the user ID is thus input, the control section 17 searches for the transmission results associated with the user ID input from the user ID management section 21.

If the transmission results associated with the user ID input are found, the control section 17 sends only these transmission results to the control-panel control section 12. The control-panel control section 12 causes the display section 10 to display only the transmission results it has received from the control section 17. Therefore, the display section 10 displays only the transmission results associated with the user ID the user has input, as is illustrated in FIG. 8.

Identification data other than the user ID may be registered, depending on the contents of a data item to be send by facsimile. For example, identification data may be input in accordance with the content and use of the document transmitted. If the identification data is input in accordance with the content and use of the document transmitted, it will be easy for the user to select only the transmission result concerning the document. It follows that only the transmission results the user wishes to check can be easily displayed and printed.

Figure 9:
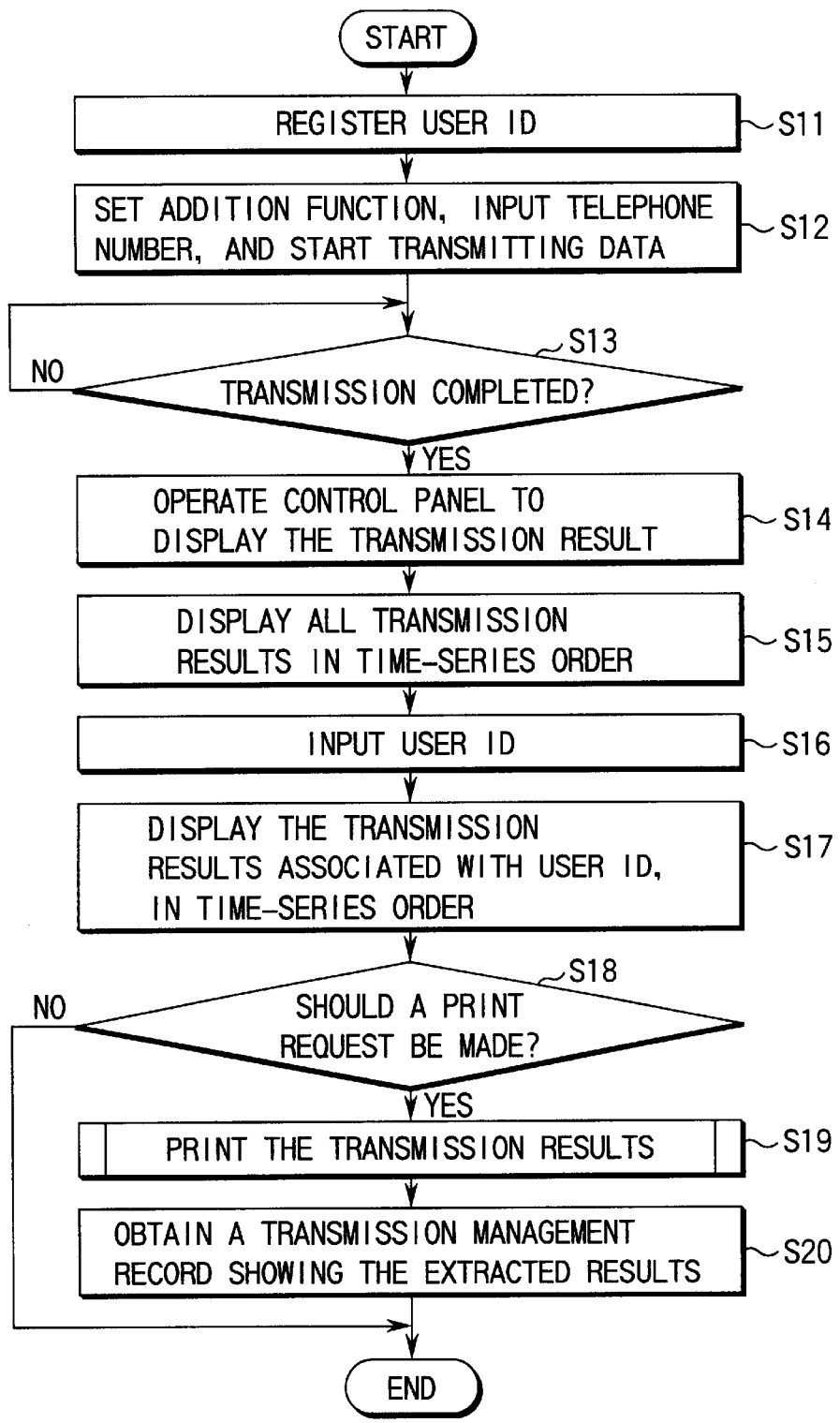
FIG. 9 is a flow chart for explaining how to display and print the transmission management record that corresponds to an user ID.

How data is transmitted and how a transmission management record is displayed and printed, by the use of the user ID, will be described with reference to the flow chart of FIG. 9.

Fist, the user places the document on the scanner 16 and operates the control panel 2, thus designating the facsimile function. Next, the user operates the ten-key pad or the like, inputting his or her user ID. After inputting the user ID, the user sets a facsimile transmission mode, such as image mode or an additional function mode. After setting the transmission mode, the user input the telephone number of the destination. Then, the user depresses the start key 32.

As a result, the control section 17 makes the scanner section 4 starts reading the document. At the same time, the control section 17 causes the facsimile section 2 to start connecting the copier 1 to the telephone at the destination. When the copier 1 is connected to the destination, the control section 17 begins to transmit the image the scanner section 4 has read (Step S12). When the image is transmitted (Step S13), the control section 17 records the transmission result in the transmission management section 18a. The control section 17 also records the transmission result in the user ID management section 19, in association with the user ID.

Thereafter, the user operates the control panel 2, designating the confirmation of the transmission results (Step S14). When the control panel 2 is so operated, the control section 17 reads all transmission results recorded in the transmission management section 18a and supplies them to the control-panel control section 12. The control-panel control section 12 controls the display control section 11, whereby the display section 10 displays a table of the transmission results, page by page, in time-series order.

While the table is being displayed on the screen, the user operates the ten-key pad, thereby inputting the user ID (Step S16). Then, the control section 17 searches the user ID management section 19 for the transmission results associated with the user ID input. Only the transmission results associated with the user ID are extracted from the section 19. The display section 10 displays a table of the results extracted, as is illustrated in FIG. 8 (Step S17).

Seeing the transmission results displayed by the display section 10, the user makes a request for printing these transmission results or makes no such requests (Step S18). To have the results printed, the user depresses the start key 32. If the user does not want to get the results printed, he or she depresses the clear key 33.

If the start key 32 is depressed, the control section 17 causes the printer section 6 to print only the transmission results displayed by the display section 10 and associated with the user ID (Step S19). That is, a transmission management record showing the extracted results associated with the user ID is printed as shown in FIG. 6 (Step S20).

As described above, the user ID is input to start the facsimile transmission. Thereafter, the user inputs the user ID again to have the transmission results displayed. The control section extracts only the transmission results associated with the user ID and makes the display section display these transmission results only.

Since only the transmission results associated with the user ID are displayed, it is easy for the user to check and confirm these transmission results.

Further, only the transmission results associated with the user ID can be printed when the user instructs the printing of only the transmission results he or she wants to check, while these transmission are being displayed. Hence, a transmission management record that is easy to review can be presented, without wasting paper sheets.

What is claimed is:

1. A facsimile apparatus comprising:
   an operating panel having a display section with an incorporated touch panel;
   a facsimile section operating when a transmission destination and an instruction for starting facsimile transmission are entered from the operating panel, and transmitting facsimile data to the transmission destination through a communication line;
   a transmission management section for storing transmission results of the facsimile data transmitted by the facsimile section;
   a control section operating when an instruction is entered to confirm transmission results stored in the transmission management section, and displaying a list of the transmission results on the display section; and
   an output section operating when transmission results to be output are selected from the list of the transmission results using the touch panel, and outputting only the selected transmission results.

2. A facsimile apparatus according to claim 1, wherein the output section is a printer for printing only transmission results selected on the touch panel, on an image recording medium.

3. A facsimile apparatus according to claim 1, wherein the output section is a display control section for displaying only transmission results selected on the touch panel.

4. A facsimile apparatus according to claim 1, further comprising an identification data management section for checking whether or not identification data related to a transmission content to be transmitted are entered using the touch panel when an instruction to start facsimile transmission is input,
   said control section operating when identification data is entered using the touch panel in a state where a list of transmission results are displayed on the display section, and selecting all transmission results associated with the identification data stored in the transmission management section.

5. A facsimile apparatus according to claim 4, wherein the identification data further identifies a content or purpose of a document that corresponds to the transmission content to be transmitted.

6. A method which a facsimile apparatus uses to confirm transmission results, comprising:
   checking whether or not a transmission destination and an instruction for starting facsimile transmission are entered from an operating panel having a display section with an incorporated touch panel, and transmitting facsimile data to the transmission destination through a communication line;
   storing transmission results of the facsimile data transmitted by the facsimile section;
   checking whether or not an instruction is entered to confirm transmission results stored in the transmission management section, and displaying a list of the transmission results on the display section; and
   checking whether or not transmission results to be output are selected from the list of the transmission results using the touch panel, and outputting only the selected transmission results.

7. A method according to claim 6, wherein transmission results selected using the touch panel are output by being printed on an image recording medium using a printer.

8. A method according to claim 6, wherein transmission results selected using the touch panel are output by being displayed on the display section.

9. A method according to claim 6, further comprising checking whether or not identification data related to a transmission content to be transmitted are entered using the touch panel when an instruction to start facsimile transmission is input, transmission results selected using the touch panel being displayed by checking whether or not identification data is entered using the touch panel in a state where a list of transmission results are displayed on the display section, and selecting all transmission results associated with the identification data stored in the transmission management section.

10. A method according to claim 9, wherein the identification data further identifies a content or purpose of a document that corresponds to the transmission content to be transmitted.

* * * * *